United States Patent [19]

Imoto et al.

[11] 4,206,167

[45] Jun. 3, 1980

[54] METHOD FOR MANUFACTURE OF MAN-MADE FISH-GATHERING PLATES

[75] Inventors: Shozo Imoto, Tokyo; Masao Imoto, Katsuta; Seiki Murakami, Kawagoe; Masumu Hasegawa, Kasukabe; Toshiharu Nakanishi, Tokyo, all of Japan

[73] Assignee: Toppan Printing Co., Ltd., Tokyo, Japan

[21] Appl. No.: 867,195

[22] Filed: Jan. 5, 1978

Related U.S. Application Data

[63] Continuation-in-part of Ser. No. 675,255, Apr. 8, 1976, abandoned.

[51] Int. Cl.$^2$ .................. B29G 1/00; B29G 31/00; B29F 5/00
[52] U.S. Cl. .................. 264/138; 156/244.18; 156/245; 264/37; 264/141; 264/148; 264/157; 264/248; 264/294
[58] Field of Search .................. 264/329, 37, 138, 141, 264/148, 248, 294, 157; 34/12; 431/18; 425/550, 551, 547; 366/23, 144, 148; 156/244.18, 244.24, 244.27, 245, 306

[56] References Cited

U.S. PATENT DOCUMENTS

| | | | |
|---|---|---|---|
| 2,351,774 | 6/1944 | McGowen | 425/547 |
| 2,705,133 | 3/1955 | Barber et al. | 366/23 |
| 2,828,508 | 4/1958 | LaBarre | 425/547 |
| 3,671,615 | 6/1972 | Price | 264/122 |
| 3,844,701 | 10/1974 | Rockwell | 425/451 |
| 3,897,527 | 7/1975 | Ringdal | 264/37 |
| 3,950,484 | 4/1976 | Egli | 264/329 |
| 4,028,448 | 6/1977 | Hashimoto et al. | 264/37 |
| 4,067,826 | 1/1978 | Emery | 264/37 |

*Primary Examiner*—W. E. Hoag
*Attorney, Agent, or Firm*—Carroll F. Palmer

[57] ABSTRACT

A method for the manufacture of man-made fish-gathering plates having specific gravity between about 1.2 to 1.8 comprising the steps of providing a charge of raw material consisting of subdivided composite plastic consisting of at least two types of thermofusible plastic material or at least one type of thermofusible plastic material and non-plastic material, forming a molten mass from said charge of raw material by mixing by an agitator said charge with particulate inorganic material so the molten mass contains 25 to 70 weight percent of thermofusible plastic material as a bonding agent, said inorganic material being preheated to a temperature suitable for melting the thermofusible plastic material as a bonding agent and said agitator being kept at substantially the same temperature, charging the molten mass into a mold in a press machine to form it into a shape conforming to the shape of the mold, and after cooling solidifying the resulting shaped article, removing it from the mold.

7 Claims, 20 Drawing Figures

FIG. 1

- - - - ▶ WASTE GAS STREAM
——▷ MASS STREAM

METHOD FOR MANUFACTURE OF MAN-MADE FISH-GATHERING PLATES

CROSS-REFERENCE TO RELATED APPLICATION

This application is a continuation-in-part application of the U.S. patent application Ser. No. 675,255 filed on Apr. 8, 1976 now abandoned.

BACKGROUND OF THE INVENTION

This invention relates to a method for the manufacture of man-made fish-gathering plates and, in particular, a method for the manufacture of man-made fish-gathering plates comprising plastic waste products discarded in greater amounts from households, works etc. and a variety of inorganic materials not capable of being incinerated due to their nonflammablility.

Of a huge amount of a solids waste discarded from households, factories etc., plastic waste products account for a great percentage. Among these, most of plastic waste products are composite articles consisting of various types of synthetic resins, composite articles (such as laminates consisting of a combination of synthetic resin with a paper, metal foil etc.) consisting of synthetic resin and non-plastic material, a lesser amount of the plastic waste article being made of one type of synthetic resin. The plastic waste product often includes a vinyl chloride resin etc. which evolves an obnoxious gas such as a hydrogen chloride gas etc. when heated. However, most of the plastic waste products are not indentifiable. The plastic waste products are present in the form of films, strips, pellets, sheets, and so on. The following table shows an example of plastic waste products discarded from a certain factory. This shows a diversity of plastic waste products.

Table

|  | type | shape |
|---|---|---|
| single form | polyethylene | film |
|  | polypropylene | " |
|  | nylon | " |
|  | polyester | " |
|  | triacetate | " |
|  | polyamide | " |
|  | polyvinyl alcohol | " |
|  | polyvinyl chloride | soft film |
|  | polystyrene | synthetic paper |
|  | polycarbonate | sheet |
|  | polyacrylic ester | " |
| composite form | polyester + polyethylene | laminated film |
|  | cellophane + polyethylene | " |
|  | cellophane + polypropylene | " |
|  | nylon + polyethylene | " |
|  | polyester + polyethylene | " |
|  | polyester + polypropylene | " |
|  | polyester + polyethylene + polypropylene | " |
|  | polyester + polyvinyl alcohol + polyethylene | " |
|  | polyester + cellophane + polystyrene | " |
|  | cellophane + polyethylene | laminated bag |
|  | paper + polyvinyl chloride | laminated thin sheet label |
|  | paper + aluminium foil + polyethylene |  |
|  | aluminium foil + polyethylene | " |
|  | polyethylene + aluminium foil + cellophane + polyethylene | " |
|  | polyester + aluminium foil + polyethylene | " |
|  | polystyrene + polyvinyl chloride | foamed sheet |
|  | polyethylene | formed sheet |

Table-continued

|  | type | shape |
|---|---|---|
|  | + polyvinyl chloride |  |

The composite plastic waste products have been principally incinerated or embedded in the earth, presenting a cause of a secondary public nuisance such as evolution of noxious thermodecomposition gases, lowering of a bearing force of soil etc. There has been a growing demand for a most suitable method for the treatment of plastic waste products.

SUMMARY OF THE INVENTION

The object of this invention is to provide a method for the manufacture of man-made fish-gathering plates comprising composite moldings excellent in strength and moldability by melting and solidifying composite plastic waste products and inorganic substances.

Another object of this invention is to provide a mold suitable for the manufacture of man-made fish-gathering plates comprising composite moldings excellent in strength and moldability, by the use of composite plastic waste products and inorganic substances.

Composite moldings according to this invention are formed by using a combination of a crushed composite plastic waste consisting of either at least two types of plastics or plastic material and non-plastic material with particulate and powdered inorganic materials added as a heating medium, the combination material containing 25 to 70 weight percent of thermofusible plastic product as a bonding agent.

A composite moldings manufacturing method according to this invention comprises the steps of agitatingly mixing together as a raw material a crushed composite plastic waste consisting of either at least two types of plastics or plastic material and non-plastic material and particulate or powdered inorganic substances preheated to the temperature suitable for melting a bonding agent constituting 25 to 70 weight percent of a thermally fusible plastic based on the whole weight of the raw material, supplying the melted mixture into a mold to compress it within the mold and, after cooling, extracting a solidified, shaped article from the mold.

BRIEF DESCRIPTION OF THE DRAWINGS

This invention will now be described by way of example by reference to the accompanying drawings.

DETAILED DESCRIPTION OF THE PREFERRED EMBODIMENTS

This invention will now be explained by referring to the accompanying drawings.

Figure 1:
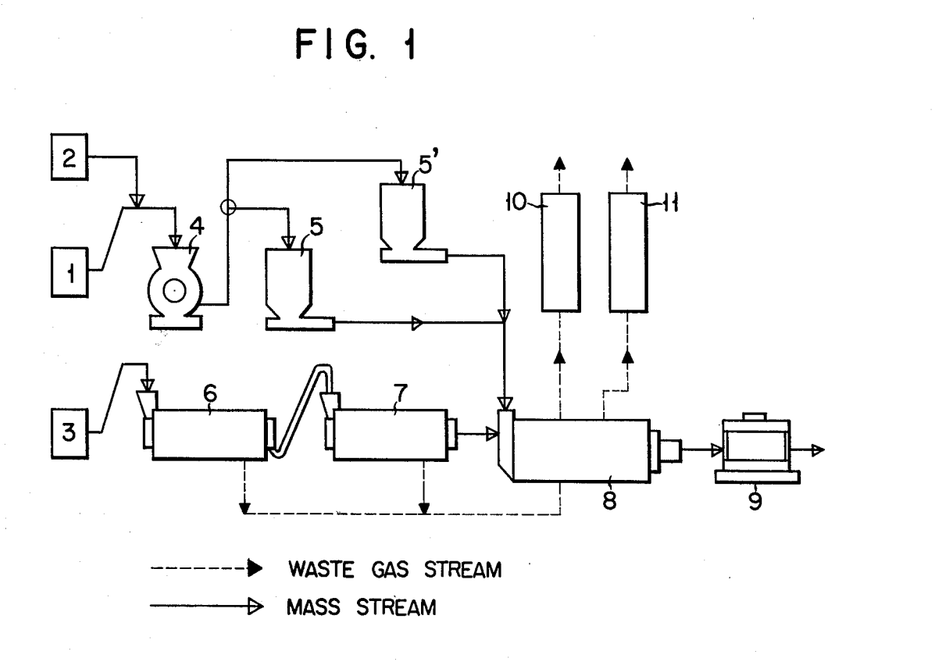
FIG. 1 is a flow diagram showing a method for the manufacture of man-made fish-gathering plates.

FIG. 1 is a flow diagram showing the manufacture of fish-gathering plates according to this invention. In FIG. 1 a variety of waste plastic products 1 are charged into a crusher 4 to be reduced to a size of less than several centimeters and then stored in a storage container 5. A bonding agent is, like the plastic waste products, crushed and stored in the storage container 51. The plastic waste product 1 consists of a composite plastic i.e. a combination of at least two types of plastics or plastic material and non-plastic material such as a paper, metal cellophane etc. and, the bonding agent 2 consists of a variety of thermally fusible plastic products. An inorganic material 3 for use as a heating medium is dehydrated by a dehydrator 6 when it is wet and heated by a heating device 7 such as a rotary kiln etc. The heating medium 3 is a non-combustible inorganic material such as sludge, incinerated ash, metal scraps, crashed stone, earth and sand etc. which is stable in a temperature range of 200° to 800° C. It is preferred that 30 to 70 weight percent of the inorganic material 3 based on the weight of the raw material. For a value less than 30 weight percent, an amount of heat is insufficient and for a value exceeding 70 weight percent, the strength of the shaped article is lowered. The heating device 7 is maintained to an internal temperature of 700° to 800° C. and the heating medium 3 is heated to a temperature suitable for melting the bonding agent. The temperature of the heating medium 3 is determined dependent upon the type of the plastic product as a bonding agent. Where 50 to 60 weight percent of sand is used as a heating medium based on the whole weight of the raw material, the following temperature ranges are used which are suitable to melt a variety of thermofusible plastics as a bonding agent.

| | |
|---|---|
| polyethylene | 160°–300° C. |
| polypropylene | 200°–300° C. |
| polystyrene | 250°–300° C. |
| polyvinyl chloride | 150°–170° C. |
| 6-nylon | 250°–300° C. |
| polyester | 290°–350° C. |

The upper limit of the temperature range is set from the standpoints of economy or to prevent generation of decomposed gas or damage to a heating furnace. The lower limit is set at a temperature relatively higher than the melting point, since an excessive melting time is required at a temperature very close to the melting point. The waste plastic product 1, bonding agent 2 and heating medium (inorganic material) 3 are quantitatively taken out and agitatingly mixed together. Since the waste plastic product 1 and heating medium 3 are in the form of powder and particle, the uniform mixing of these materials can be effected and the mixture is heated by the heating medium 3 to form, together with the melted bonding agent, a melted mixture. An agitator or kneader 8 is kept to a temperature substantially the same as that of the heating medium so as to effect a smooth heating by the heating medium 3. An economic heating method is to send a combustion gas evolved from a dryer 6 and heating device 7 to the agitator 8. The melted mixture in the agitator 8 is supplied in constant amount to a pressing machine 9 to form a molded article. The molded article is water- or air-cooled according to the type of the molded article and removed from the pressing machine. As a result, a composite plastic article according to this invention is obtained. Reference numerals 10 and 11 are purification towers for treating a waste gas evolved during the melting of the bonding agent.

As the thermofusible resin for use as a bonding agent, use may be one contained in the waste plastic product or a fresh thermofusible resin is added to the waste plastic product, 25 to 70% of the bonding agent being sufficient based on the whole weight of the raw material. Suppose, for example, that the waste plastic product includes polyethylene melted at 200° C. and polyester melted at 300° C. If in this case the temperature of the heating medium is set to 200° C., more than 25% of polyethylene as a bonding agent must be included based on the whole weight of the raw material.

If more than two kinds of plastic materials different in melting temperature from each other are included in the raw material and the low melting plastic material is decomposed at a high melting temperature, the temperature of the heating medium should be set to the temperature suitable for melting the low melting plastic material. In this case, the low melting plastic serves as a bonding agent. When the raw material contains at least two types of thermofusible plastics and a small amount of low melting thermofusible plastic is used, a high melting thermofusible plastic acts as a bonding agent.

This invention can be advantageously applied also to the case where the raw material includes a resin such as polyvinyl chloride which evolves a hydrogen chloride gas during a heating period. If in this case a greater amount of thermofusible plastic resin such as polyolefin resin is added, as a bonding agent, to the waste plastic product, the content of polyvinyl chloride in the raw material is decreased and the mixture can be agitated at a temperature lower than that at which any obnoxious gas such as a chlorine gas or a hydrogen chloride gas is evolved. As a result, a melted mixture can be obtained without trouble.

The content of the bonding agent must be in a range of more than 25% from the standpoint of a strength. Generally, the higher the content of the bonding agent the stronger the shaped article. When the content of the bonding agent exceeds 70%, a very long melting time is required, making it difficult to adopt the heating method by the heating medium. Therefore, 25 to 70% of the bonding agent is required based on the whole weight of the raw material.

Even if any product such as a paper, cellophane etc., which is carbonized when heated, is included in the raw material, it is shredded and crushed. Then, a thermofusible plastic is added as a bonding agent and a resultant mixture is efficiently heated by the heating medium (internal heating method) to form a melted mixture. It is therefore possible to obtain a shaped article from the melted mixture. The shaped articles are manufactured using such raw material. The articles are passed over a support bar in a each mounting hole to be assembled into a man-made gathering plate for fish. The assembly is sunk into the sea bed. The specific gravity of the shaped article must be in a range of 1.2 to 1.8 so as to be unmovably placed on the sea bed. Suppose, for example, that river sand of an average specific gravity of 2.2 is used as the inorganic material and that a waste plastics of an average specific gravity of 0.9 is used as the composite plastics. If in this case 42 to 70 weight percent (23 to 50 volume percent) of river sand is used based on the whole weight of the raw material, it is possible to product an article having a specific gravity of 1.2 to 1.55.

The manufacture of the plastic article will now be explained more in detail below.

Figure 2:
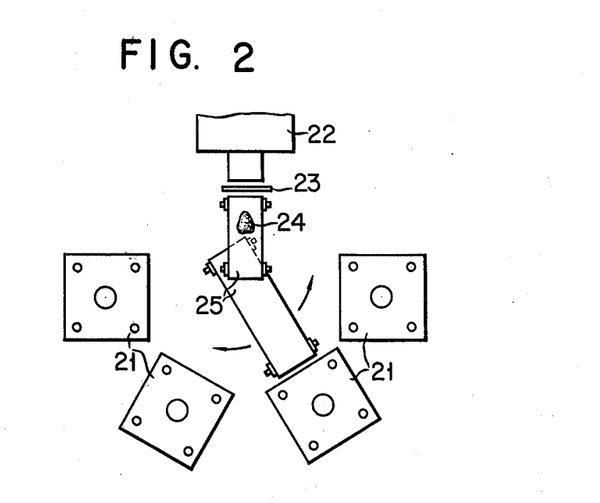
FIG. 2 is a plan view showing part of a conventional machine for supplying moldings material to each mold.
Figure 3:
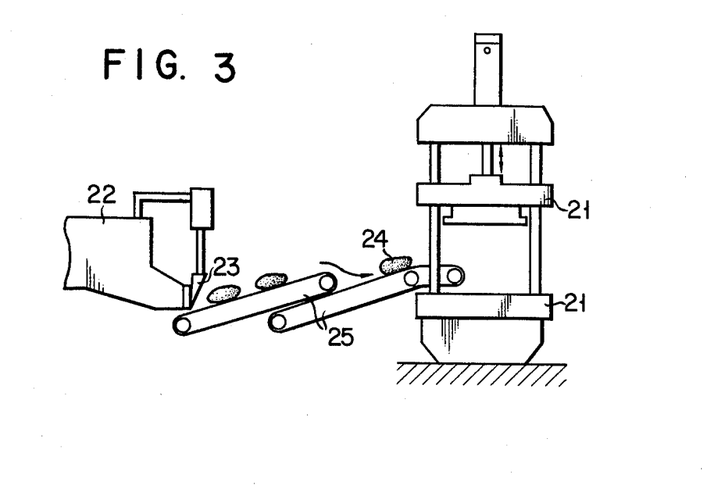
FIG. 3 is a side view showing part of a molding machine in FIG. 2.

In a conventional molding machine, a melted mixture 24 is supplied from a supply device through a constant supply cutter 23 to a conveyor type supply means 25 and charged into each metal mold 21 by the movement of the supply means 25. In this case, however, a mold is compressed by the press molding machine for several tens of minutes during which a shaped article is allowed to completely cool to room temperature. Since during this portion of the time period the press molding machine remains occupied, a plurality of press molding machines are required and, furthermore, the production of shaped articles is prominently lowered.

Such drawbacks can be overcome by the following continuous molding method.

Figure 4:
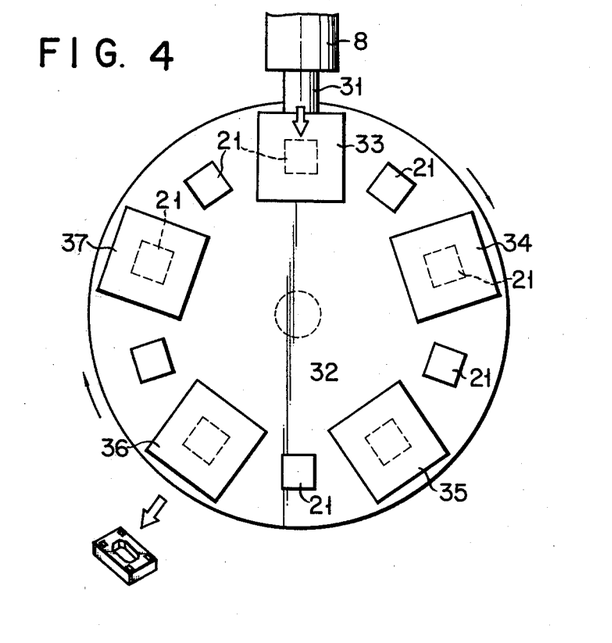
FIG. 4 is a plan view showing one embodiment of the molding machine used in a method according to this invention.

In FIG. 4 an extruder 31 is adapted to charge melted mixture 24 from the agitator 8 in FIG. 1 into each mold 21. The extruder 31 is so disposed that the melted mixture can be charged through a filling device into the mold. A suitable number (10 in this case) of molds 21 are moved step by step, in a direction indicated by arrows, by a mold feed device 32 such as a disk or a guide rail. A press type mold closing device 34 for vertically opening and closing the mold 21 as well as effecting a locking action, cooling device 35 for cooling the mold during the molding operation, shaped article removing device 36, and device 37 for applying a mold release agent to the surface of the mold are arranged at predetermined intervals in a manner that they are opposed to the molds 21. The molding operation is automated in each cycle from the step of charging a melted mixture into the mold to the step of removing a shaped article away from the mold. An increased production can be attained according to this method.

Figure 5:
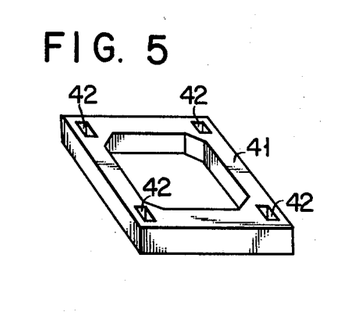
FIG. 5 is a perspective view showing a fish-gathering plate manufactured by the method according to this invention.
Figure 6:
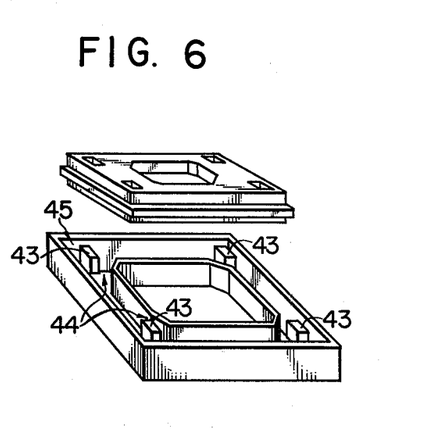
FIG. 6 is a perspective view showing a conventional metal mold for forming a shaped article in FIG. 5.

Since, as mentioned, the inorganic material such as sand etc. are included in the melted mixture, if boring etc. are effected in the shaped article, difficulty is encountered in effecting the re-machining of the shaped article due to the presence of the inorganic material. Where a shaped article for example, "a gathering plate for high," with connecting holes 42 as shown, for example, in FIG. 5 is manufactured, boss 43 corresponding to the connecting holes 42 of the shaped article are provided on that side of the mold 21 where the melted mixture is charged. Since the melted mixture formed by the method of this invention is highly viscous with poor fluidity, it can not be sufficiently charged at the narrow place as well as at the corners of the mold 21, these providing the tendency of incomplete moldings to be formed due to an insufficient supply of the melted mixture. If the heating medium in the raw material is heated enough to permit the melted mixture to be sufficiently charged in the mold, damage is caused to the heating device and there is involved a decomposition gas, presenting a problem of air pollution. For this reason, it is desired that the heating temperature be maintained as low as possible. Therefore, there is a demand for the development of a method for the manufacture of moldings as applicable even when the melted mixture is highly viscous at low temperature and contains hard particles or granules such as sand etc.

In order to overcome the above-mentioned drawbacks, the following methods are usable. One method is to charge a melted mixture in a suitably divided fashion into the mold so as to conform to the shape of the mold. Another method is to use a mold suitable for a melted mixture with low viscosity. The former method will now be explained in connection with the manufacture of a gathering plate for fish.

FIG. 5 shows a fish-gathering plate molded by this method and the plate has an opening on the center through which fish is moved. A fish-gathering assembly is three-dimensionally formed by passing a support rod into each connecting hole 42. This method is to cut a substantially cylindrical form of a melted mixture into suitable lengths and charge it in a divided mass in each section of the mold. For a rectangular fish-gathering plate, the substantially cylindrical form of the melted mixture is drawn out and cut into four lengths and charged into each corresponding section of the mold. This method will be explained more in detail by reference to FIGS. 7, 8, 9 and 10.

Figure 7:
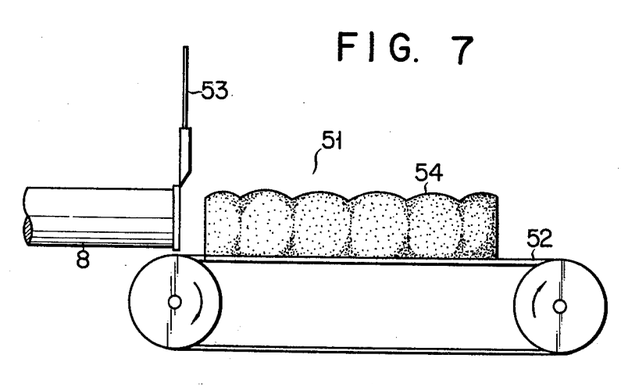
FIG. 7 is a front view diagrammatically showing a cutting blade for cutting a high viscous raw material.

FIG. 7 is a schematic view showing a cutting device 53. A melted mass from the kneader 8, which is highly viscous with poor fluidity is placed onto a conveyor 52 which is run at a control speed. The diameter of the substantially cylindrical form of a highly viscous mass can be varied by controlling the speed of the conveyor 52 according to the size of a rectangular fish-gathering frame i.e., according to the corresponding dimension of the mold. The continuous viscous mass is cut, by adjusting the speed of the conveyor 52, to a predetermined length so that the length of the mass is separatedly and adequately charged four times in the four sections of the mold.

Figure 8:
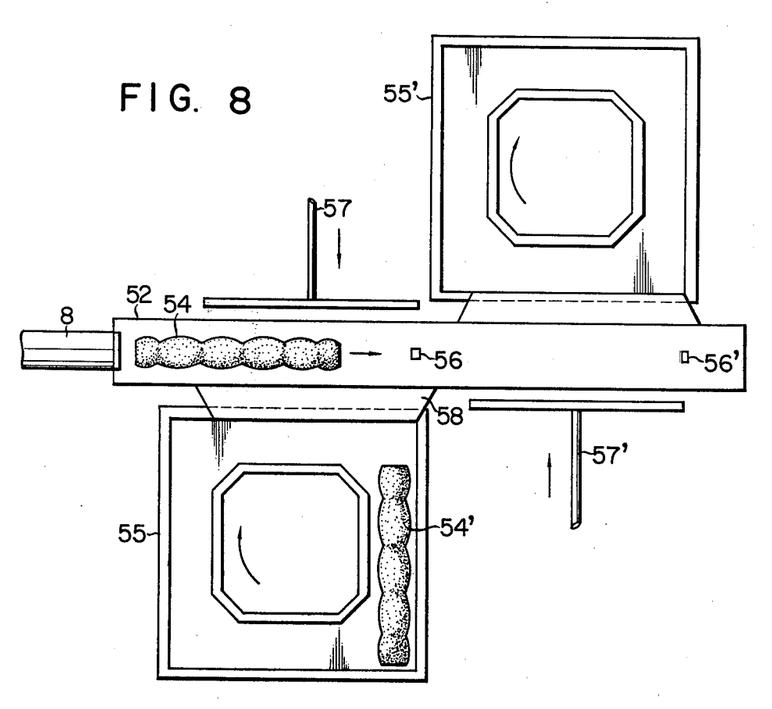
FIG. 8 is a plan view showing a molding machine according to one embodiment of this invention.
Figure 9:
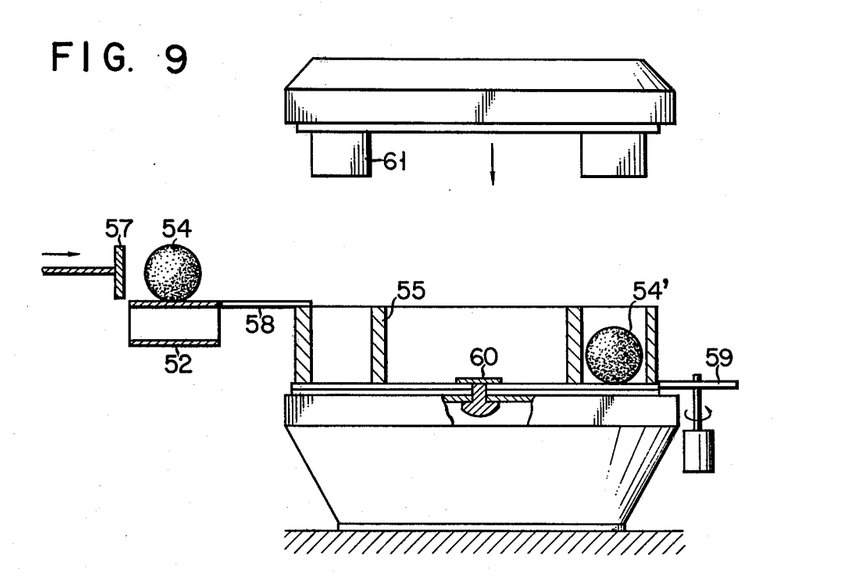
FIG. 9 is a side view showing the molding machine in FIG. 8.

That is, when the viscous mass from the kneader 8 reaches a predetermined length, it is cut by the cutter 53 to provide a length of viscous mass 54. As shown in FIG. 8 the length of the mass 54 is carried by the conveyor 52 to a predetermined charging position. The conveyor 52 can be used for the withdrawal of the viscous mass and another conveyor or truck (or trolley) be used for delivery of the viscous mass. The charging position of the viscous mass 54 should be parallel to one side of a lower mold half 55. The arrival of the length of the viscous mass 54 at the corresponding charging position is detected by a detector 56 or 56'. When the forward end of the viscous mass is detected by the detector 56 or 56', the pushing plate 57 or 57' is actuated by a piston etc. to cause the viscous mass to be charged into the cavity of the lower mold half 55 or 55'. 54' shows the viscous mass charged into the cavity of the lower mold half, and 58 is a charging guide plate connecting the conveyor 52 to the lower mold half 55. Since the length of the viscous mass is charged into each cavity side section of the lower mold half 55, when the first charge is completed, the lower mold half 55 is rotated, through an angle of 90°, through an idle gear 59 with the lower mold half shaft 60 as a center as shown in FIG. 9. Then, the next viscous mass is moved into alignment with the guide plate 58 and charged into another cavity side section of the mold. In this way, the above-mentioned operation in repeated for each side cavity section of the lower mold half 55. The weight of a rectangular fish-gathering frame corresponds to the whole weight of the so charged four viscous masses in the respective cavity side sections of the lower mold. After this operation is completed, an upper metal mold half 61 is lowered to cause the viscous mass in the lower mold half to be compression molded. Since the viscous mass contains a heating medium, such as sand, having a small heat conductivity, the material shows a heat retaining property during the molding operation. After completion of the thermocompression molding the mold can also be passed through a cooling water to hasten the solidification of a shaped article. This molding method can be economically effected as shown in FIG. 8 by effecting a molding operation at one mold, while at the same time effecting a charging operation at another mold.

Figure 10:
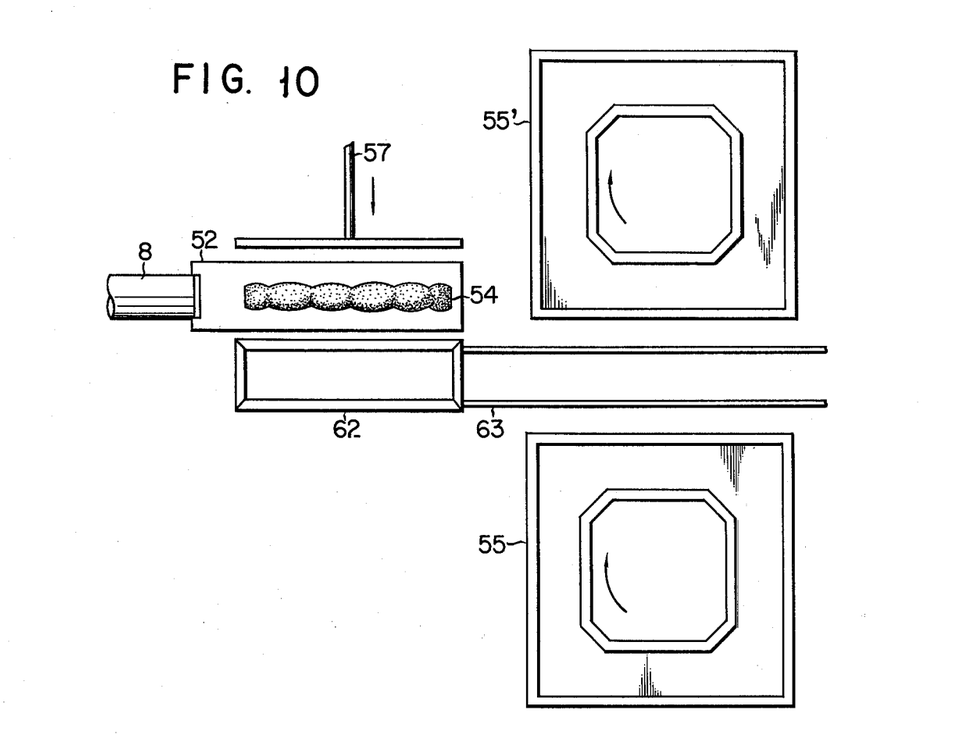
FIG. 10 is a plan view showing a trolley as a transporting means.

FIG. 10 shows a molding machine having a trolley or truck 62 as a means for transporting a viscous mass 54. The viscous mass 54 is pushed by a pushing plate 57 into the truck. The truck 62 is run along rails 63 toward a charging position where it is tilted to cause the viscous mass 54 into a lower mold half 55 or 55'. The use of the truck only requires a single pushing plate, offering the advantage of saving a mold occupation area.

Figure 18:
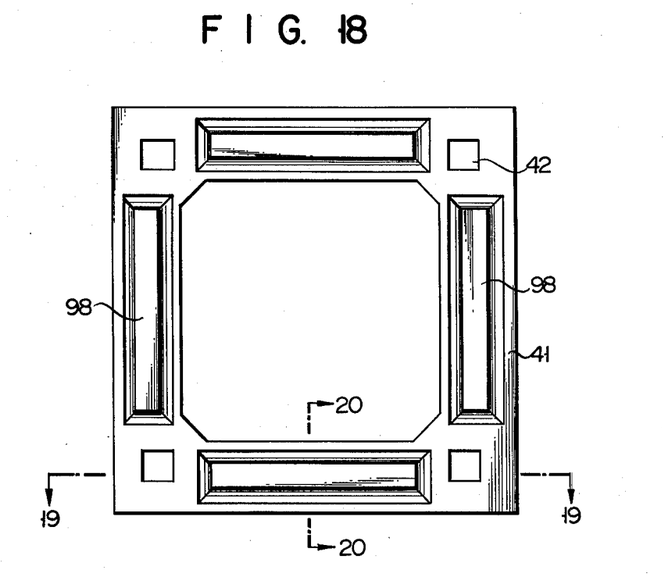
FIG. 18 is a plan view showing a fish-gathering plates having recesses at the upper surface.
Figure 19:
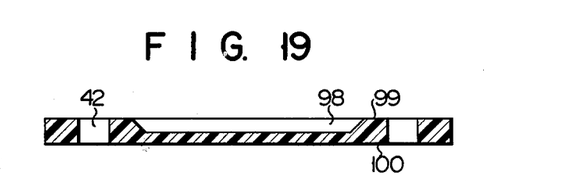
FIG. 19 is a cross section taken along the line 19—19 in FIG. 18.
Figure 20:
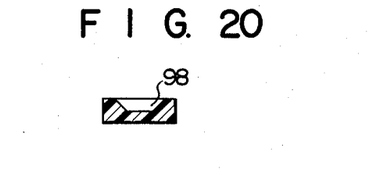
FIG. 20 is a cross section taken along the line 20—20 in FIG. 18.

In the above-mentioned molding method, molten masses are sequentially charged into each section of the mold cavity and then compressed. The surface temperature of the molten mass is lowered in 7 to 8 minutes to form a hardened surface film, and followed by a compression step. As a result, there is a risk that a crack or breakage will occur due to an insufficient union of those end portions of the molten masses which correspond to the corners of the resultant fish-gathering plates or frames. Furthermore, an insufficiency of the molten mass occurs at each corner of the mold cavity owing to a connecting hole being formed at each corner of the mold cavity during the molding operation. Voids tends to be formed by a gas which is generated owing to the decomposition of some plastics. The formation of such voids produces dimples on the surface of the shaped article after cooling. Such an incomplete union between the charged molten masses, and dimples on the surface of the shaped article, lead to a weakening of the strength of the resultant fish-gathering plates or frames. These drawbacks can be overcome as follows. In FIGS. 18 to 20, recesses 98 are provided one between paired corners of the upper surface 99 and/or the lower surface 100 of a molded plate or frame. The recess 98 can be easily formed by using a metal mold equipped with an attachment having a suitable thickness. When such type of metal mold is used, an increased pressure is exerted onto the molten mass, thus preventing an insufficient union of the molten masses and permitting an induced decomposition gas to be uniformly dispersed in the shaped article.

Explanation will now be made of the continuous molding method in which use is made of the continuous molding machine in FIG. 4 and a mold for suitably molding a low temperature viscous mixture of high viscosity.

Figure 11:
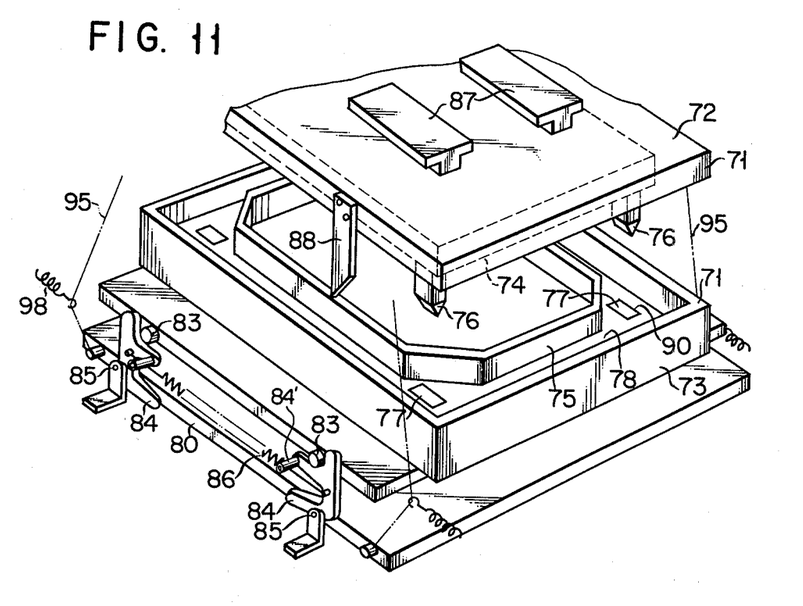
FIG. 11 is a plan view showing a metal mold used in this invention.
Figure 12:
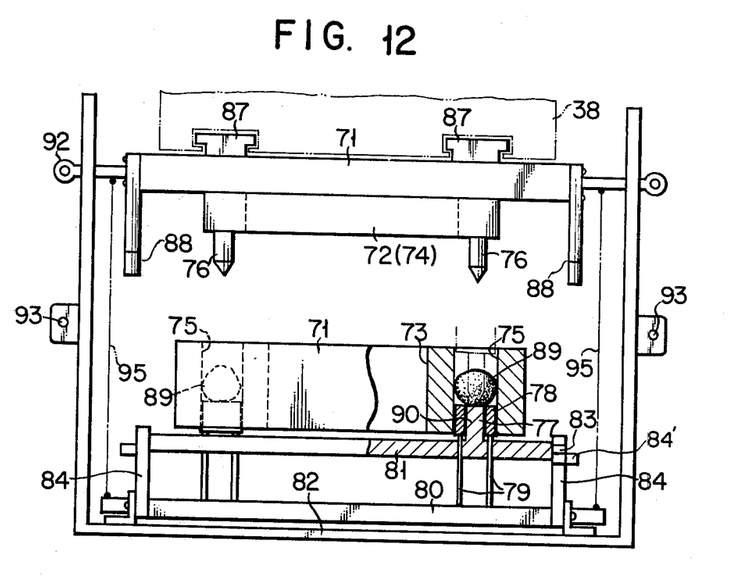
FIGS. 12 to 14 are views explaining a metal mold in FIG. 11.

When a shaped article with connecting holes 42 as shown in FIG. 5 is molded, use is made of a mold 71 as shown in FIG. 11. An upper mold half 72 has a press section 74 fitted into a section 75 of a lower mold half 73 and projections 76 extending downward from the press section 74. The projection 76 is adapted to press a projection 77 downward. As shown in FIG. 12 the bottom of the lower mold half 73 is slidably blocked by a member 78. The member 78 is mounted through a supporter 79 on the support plate 80. Between the member 78 and the support plate 80 is provided plate 81 having projections 77. The support 79 extends through the support plate 81, and the support plates 80 and 81 can be separately moved in a vertical direction. The support plates 80 and 81 can be lowered in their own weight. The downward movement of the support plate 80 is stopped by a frame 82 and the support plate 81 is supported by a combination of rollers 83 at each end thereof and stoppers 84 provided opposite to the rollers 83. As shown in FIG. 11 the stopper 84 is pivotally mounted, through a pivot 85, on the frame 82 and urged by a spring 86 so that it can be brought into engagement with the rollers 83.

Figure 13:
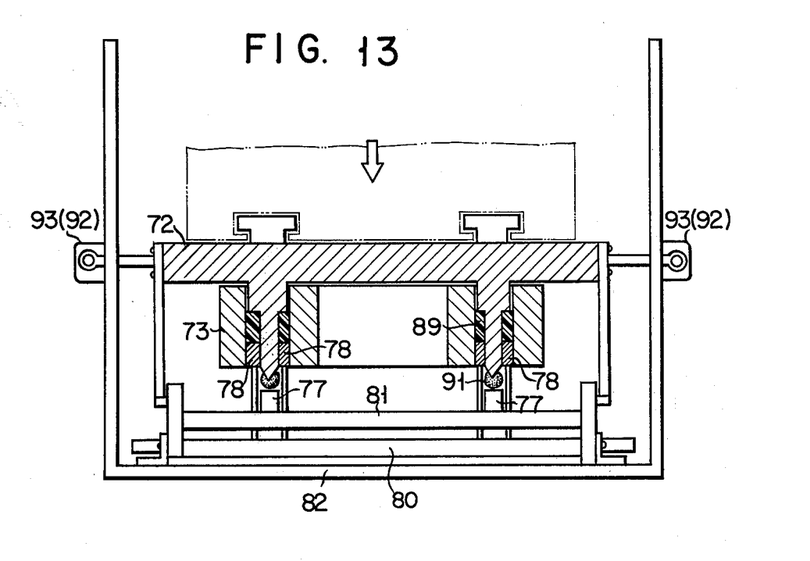
Figure 14:
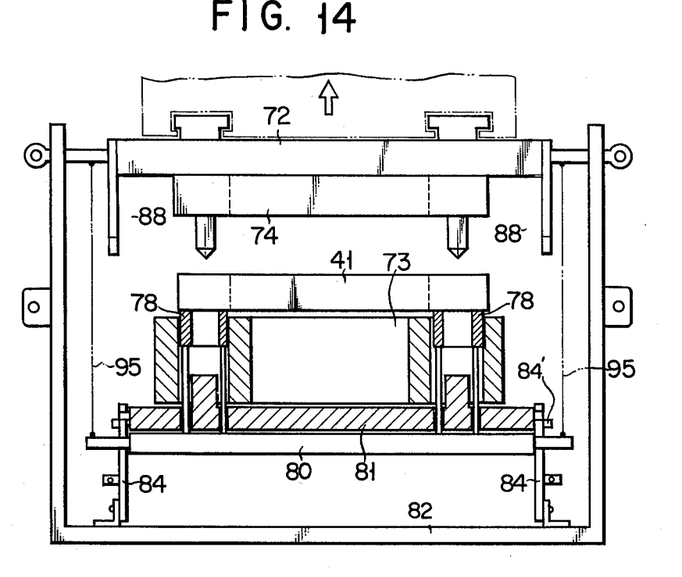
Figure 15:
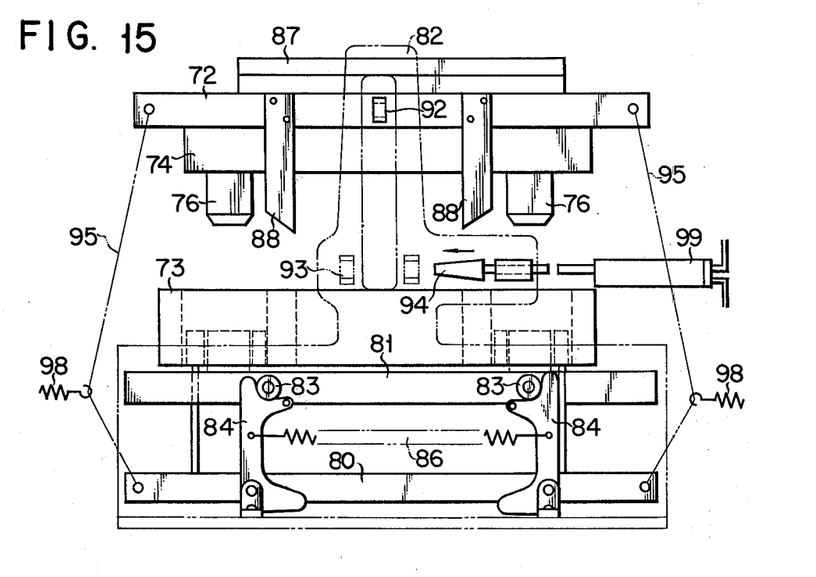
FIG. 15 is a side view showing a metal mold in FIG. 11.
Figure 16:
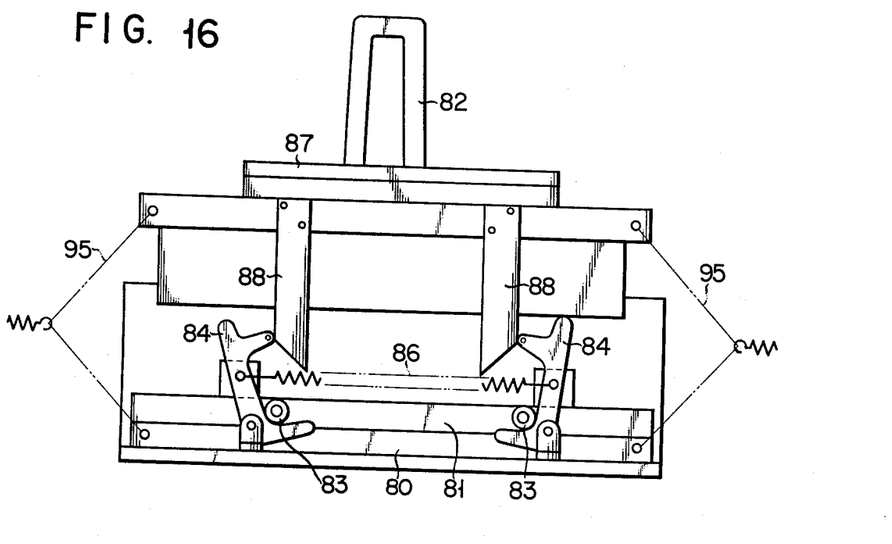
FIG. 16 is a side view showing the operation of a stopper in the mold.

The upper mold half 72 has guide sections 87 adapted to be engaged with a holding member 38 provided on each of the charging device 33, mold closing device 34, shaped article removing device 36 and mold release agent applying device 37 as shown in FIG. 4. The guide sections 87 permits the upper mold half to be moved in a vertical direction i.e., be moved downward relative to the lower mold half. The closure of the upper and lower mold halves are effected through the side wall of the frame 82, or by the other means, without trouble. Cam plates 88 are disposed at the opposite sides of the upper mold half 72 and extend downward in the opposite relation to the stoppers 84. With the mold closing device 34 as shown in FIG. 4, when the upper mold half 72 is lowered to cause a viscous mass 89 in the lower mold half 73 to be compressed sideways, the cam plate 88 causes the stopper 84 to be swung aside through a projection 84' on the stopper 84 to permit the stopper to be disengaged from the roller 83 and support plate 81 to be lowered. Upon lowering the support plate 81 the projection 76 is pierced through the viscous mass into a through hole 90, causing a part 91 of the viscous mass (FIG. 13) to be dropped. In this way, the movement of the projection 76 down into the viscous mass causes the latter to be pushed aside to obtain a shaped frame without forming an interspace or void in the neighborhood of the connecting hole 42 of the frame 41 (see FIG. 5).

The mating of the upper and lower metal frames 72 and 73 is effected by bring a hollow hook 92 of the upper mold half into alignment with hooks 93 of the lower mold half and inserting a wedge member 94 into the hole of the hooks. The wedge member is driven by a cylinder-like lock mechanism 99 disposed opposite to the wedge 93, and the mold closing and the release of the mold closing are effected.

A chain 95 is anchored at one end to the upper mold half and at the other end to the support plate 80. Upon raising the upper plate 72 the member 78 is raised through the chain 95, enabling a shape article to be floatingly removed away from the lower mold half. A spring 98 is provided to prevent sagging of the chain 95. The roller 83 disengaged from the stopper 84 during the lowering the upper mold half 72 is raised by the support plate 80 raised together with the upward movement of the upper mold half 72 causing the support plate 81 to be raised to permit the roller 83 to be engaged with the stopper 84 again.

Figure 17:
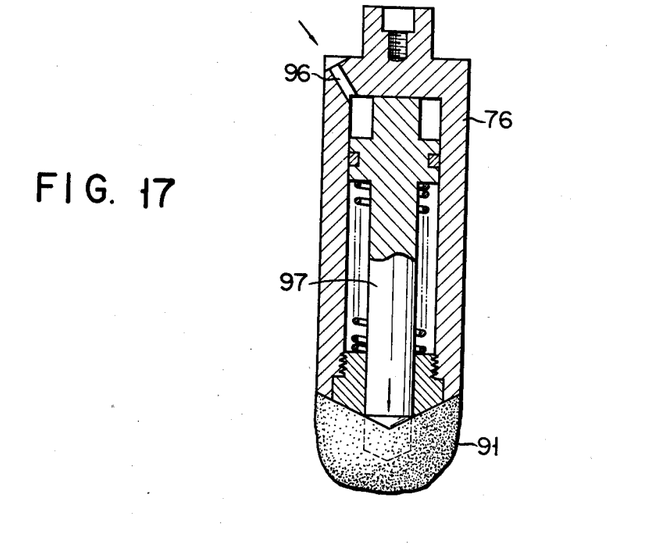
FIG. 17 is a detailed view, partially in section showing a projection in the mold.

FIG. 17 is a detailed view showing the projection 76. A part 91 of a viscous mass deposited onto the forward end of the projection is easily dropped from a piston section 97 actuated by introduction of an air through an air passage 96 of the projection 76. By adopting a mold suitable for a high viscosity mass it is possible to obtain a composite plastic article, excellent in strength and moldability, without involving an insufficient supply of raw material and without forming voids in the neighborhood of the connecting holes. Since in this method any extra supply of raw material is not required in an attempt to compensate for an insufficient supply, a deflashing or debarring operation can be omitted. This method is, therefore, suitable for the manufacture of a very hard article containing an aggregate such as sand etc., particularly a plastic article using waste plastic products as raw material.

According to this invention, it is possible to treat waste plastic products without involving public nuisance, particularly to treat composite plastic products including a non-plastic substance such as a paper, cellophane, aluminium etc. As a result, a fish-gathering plates or frames comprising a composite plastic article excellent in strength and moldability is obtained utilzing the waste plastic products. The strength of the so obtained article is shown below.

|  | Density | Bending strength (kg/cm$^2$) | Compression strength (kg/cm$^2$) |
| --- | --- | --- | --- |
| sand:cellophane: polyethylene = 50:21:29 | 1.44 | 158 | 230 |
| sand:cellophane: polyethylene = 30:10:60 | 1.25 | 165 | 183 |
| sand:aluminium foil: polyethylene = 65:5:30 | 1.58 | 156 | 207 |
| concrete using Portland cement (non-reinforced) | 2.3 to 2.6 | 30 to 50 | 150 to 250 |

The strength of shaped square samples 40×40×100 mm were tested using an Amsler type vertical compression testing machine. As a result of tests, shaped articles according to this invention are light in weight, strong in bending strength and equal in compression strength as compared with concrete. This is probably due to the fact that the bonding agent and heating medium (inorganic substance) are strongly bonded together by the above-mentioned internal heating method.

Examples of this invention will now described below.

EXAMPLE 1

50 parts by weight of heating medium sand (200° C.) and 30 parts by weight of polyethylene were added to 40 parts by weight of sharedded and crushed paper-vinyl chloride resin laminates (paper:vinyl chloride resin=66:34 by weight) and agitatingly mixed at a temperature of 200° C. within a warmed agitator to obtain a melted mixture. The melted mixture was charged in a compression mold to obtain a composite plastic article excellent in strength and moldability. In this case, the paper serves as a reinforcing material. A slight amount of hydrochloric acid gas evolved during the heating time was introduced from the agitator into alkali washing tower to effect a neutralizing treatment.

EXAMPLE 2

40 parts by weight of sand and 10 parts by weight of sludge were added as a heat medium (300° C.) to 50 parts by weight of cellophane-polyethylene (42:58) laminates and agitatingly mixed at a preset temperature of 300° C. to obtain a melted plastic mixture. In this case, cellophane was carbonized to produce minute particles and polyethylene served as a bonding agent. The melted mixture was charged in the mold to obtain a shaped article excellent in strength and moldability.

In order to examine toxicity, the elusion test was conducted for the shaped article, the results of which are as follows:

chromium hexavalent: not detected
cadmium: 0.01 ppm
lead: 0.40 ppm
cyanide: not detected From this it will be understood that the article is very low in toxicity. The test method was obeyed on Notification No. 13 from the Environment Bureau (Japan), as follows.

The shaped mass was crushed to a particle size of below 5 mm and more than 10 g of the particulate substances was weight out. It was added to 10 times its weight of water and, after agitated for six hours, analized. An atomic light absorbing analysis method was used for chromium, cadmium and lead and an ion electrode analysis method was used for cyanide.

EXAMPLE 3

40 parts by weight of a heat medium sand (300° C.) and 30 parts by weight of polyethylene were added to 50 parts by weight of shredded and crushed a three-layer laminate film, i.e. an aluminium foil-paper-polyethylene (17:55:28) laminate, and agitatingly mixed in the same manner as in Examples 1 and 2 to obtain a composite shaped article. In this case, the paper was carbonized and aluminium foil was left as a residue.

EXAMPLE 4

40 parts by weight of a sludge was added as a heating medium to 60 parts by shredded and crushed polyester-polypropylene laminate films (a suitable temperature for melting is 300° C. for polyester and 200° C. for polypropylene) and agitatingly mixed at a preset temperature of 200° C. within the agitator. The polypropylene was melted and the melted mixture containing sludge and polyester was charged in the mold, followed by cooling to obtain a composite plastic article. The elusion test was effected for the shaped article in the same method as in Example 2, the result of which is shown below:

chromium hexavalent: not detected
cadmium: 0.02 ppm
lead: not detected
cyanide: not detected

EXAMPLE 5

60 parts by weight of shredded and crushed 3-layer laminate films, i.e. polyethylene phthalate-high impact polystyrene-cellophane laminate films (60:10:30 weight percent), was agitatingly mixed with 40 parts by weight of preheated sand to obtain a melted mixture. In this case, the cellophane was carbonized and polyethylene phthalate acted as a bonding agent. The melted mixture was charged in the mold to obtain a shaped article excellent in strength and moldability.

What we claim is:

1. A method for the manufacture of man-made rectangular fish-gathering frames having an opening in the center thereof through which fish can move and having a connecting hole in each corner thereof into which a support rod is inserted to form a three dimensional fish-gathering assembly submergible in water, comprising the steps of:
   (a) providing a charge of raw material consisting of subdivided composite plastic consisting of at least two types of thermofusible plastic material or at least one type of thermofusible plastic material and non-plastic material;
   (b) forming a highly viscous molten mass from said charge of raw material by mixing by an agitator said charge with 30 to 70 weight percent of particulate inorganic material based on the weight of the raw material so that the molten mass contains 25 to 70 weight percent of thermofusible plastic material as a bonding agent and the resulting fish-gathering frames have a specific gravity of about 1.2 to 1.8, said inorganic material being at least one material selected from the group consisting of sand, earth, sludge, crushed stone, incinerated ash and metal scraps, and being preheated to a temperature suitable for melting the thermofusible plastic material as a bonding agent and said agitator being kept at substantially the same temperature;
   (c) drawing out a substantially cylindrical mass from said agitator, said mass being hot and highly viscous with poor fluidity;
   (d) cutting said cylindrical mass into substantially equal, predetermined lengths, the whole weight of four such lengths of mass corresponding to the weight of one rectangular fish-gathering frame;
   (e) charging each said length of mass into each of four cavity sections of a rectangular lower mold half;
   (f) compressing said four lengths of mass in the lower mold half by lowering a rectangular upper mold half having a projection at each corner thereof toward the lower mold half to form a rectangular shape having a connecting hole in each corner thereof; and
   (g) after cooling and solidifying the resultant shaped article, removing it from the mold.

2. The method of claim 1 in which said lower mold half has holes one at each corner thereof which correspond to the projections provided one at each corner of said upper mold half and, when the upper mold half is lowered toward the lower mold half, projections extending up into the holes of the lower mold half are lowered to permit the portions of the molten mass at the center edge of the projections to be dropped through the holes of the lower mold half.

3. The method of claim 1 wherein said agitator is heated by combustion gas evolved from a heating device for heating said inorganic material.

4. The method of claim 1 wherein said lengths of mass are charged at a charging station into a plurality of molds and the molds are moved through a mold closing station, a mold cooling station, mold removing station and mold release agent applying station in the order stated to continuously form a multitude of moldings.

5. The method of claim 1 in which when said charge of raw material contains at least two kinds of thermofusible plastic materials having different melting temperatures, a major portion of the charge is low melting plastic material and the inorganic material is preheated to the temperature suitable for melting the low melting plastic material.

6. The method of claim 1 in which when said charge of raw material contains at least two kinds of thermofusible plastic materials having different melting temperatures, a major portion of the charge is of high melting plastic material and said inorganic material is preheated to a temperature suitable for melting the high melting plastic material.

7. The method of claim 1 wherein said frames have recesses molded in their surfaces between the corners thereof, which recesses serve to prevent insufficient union of said four lengths of cylindrical mass during formation of said frames.

* * * * *